Patented Oct. 6, 1953

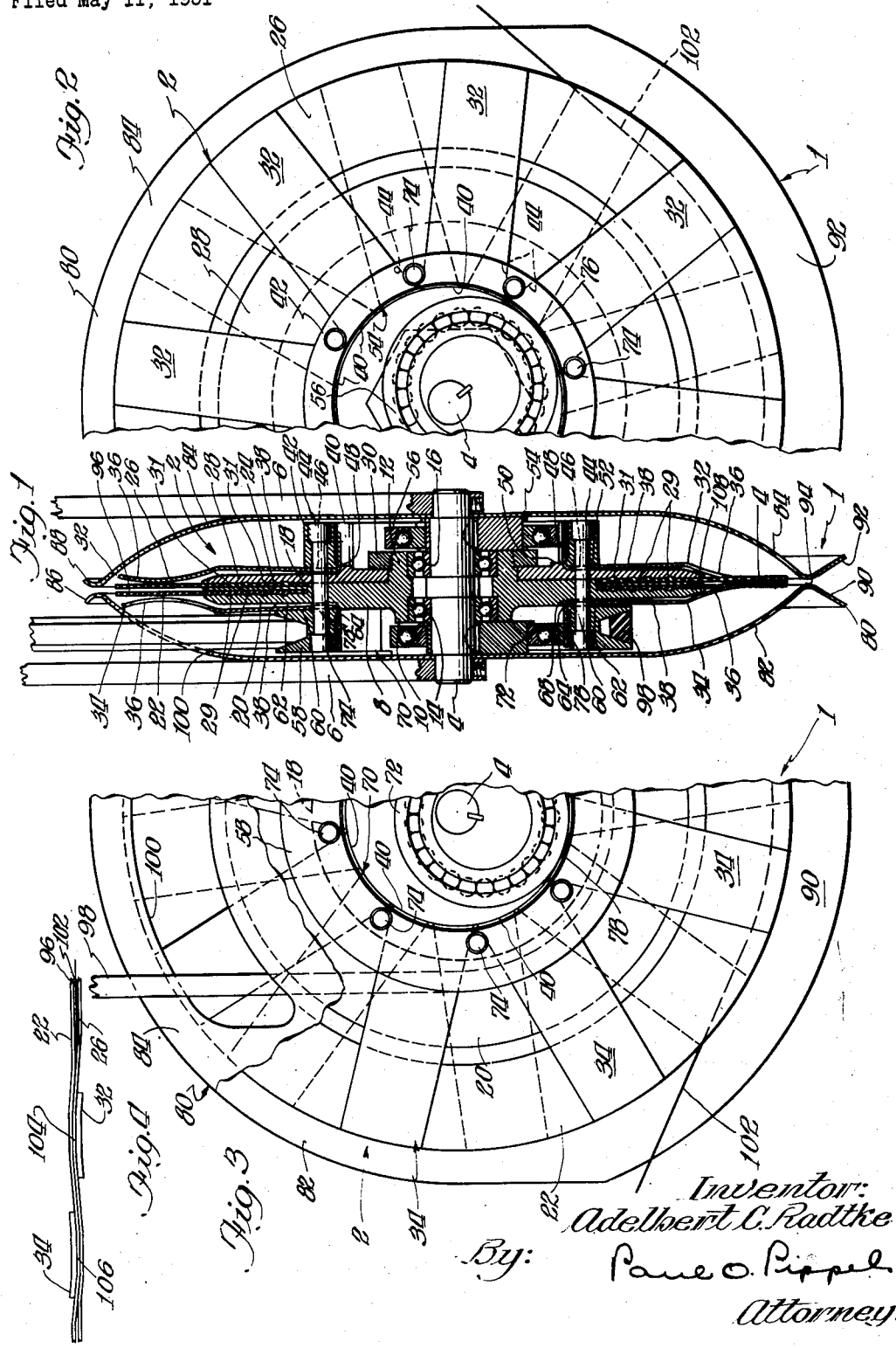

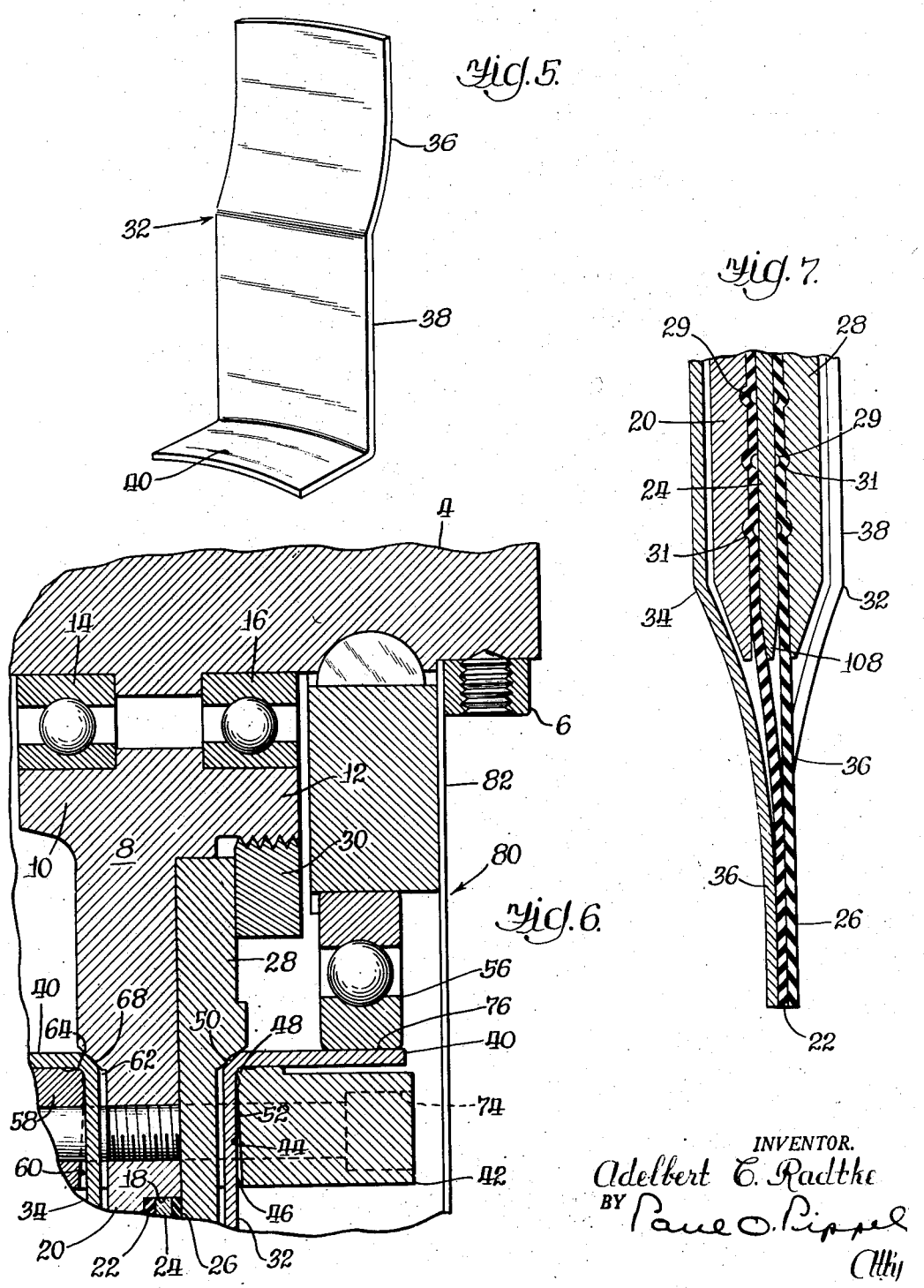

2,654,183

UNITED STATES PATENT OFFICE 2,654,183

GLASS FIBER DRAWING DEVICE

Adelbert C. Radtke, Oak Park, Ill., assignor to International Harvester Company, a corporation of New Jersey Application May 11, 1951, Serial No. 225,884

19 Claims. (Cl. 49—17)

This invention relates to apparatus for attenuating thermoplastic material and has particular reference to the manufacture of glass filaments and the like.

The production of such filaments involves several apparently disparate factors in that the nature of the elemental material simultaneously demands extremely delicate handling as well as positive, high speed, continuous and uniform processing. These requirements presented seemingly insurmountable obstacles in the development of satisfactory apparatus and heretofore dictated compromise arrangements which adversely affected the quality of the product.

A general object of the invention is to devise a simple and novel drawing mechanism which will produce a good quality product in a continuous, high speed process.

The invention contemplates grasping an extensive length of the material along a sinuous drawing surface while applying a pulling force thereon.

A more specific object is to provide a mechanism having opposed radial grasping surfaces for receiving the material therebetween, the surfaces being biased into light pressing engagement with the material along an extensive length thereof by a plurality of fingers arranged to deflect the surfaces at the grasping zone of the mechanism to obtain intimate contact with the material without deforming it.

A further object is to arrange the fingers to sinuate the surfaces with the material therebetween while simultaneously moving the surfaces to pull the material to attenuate the same.

Another object is to provide a relatively safe, shielded drawing unit of simple, economical and durable construction.

A still further object is to devise a drawing unit wherein the driving means therefor is shielded therewith to reduce air turbulence which otherwise may affect the course of the strand.

These and other objects of the invention will become more apparent from the specification and the drawings, wherein:

Figure 1 is a radial cross-sectional view of my novel drawing mechanism,

Figures 2 and 3 are fragmentary right and left side views respectively of Figure 1 with portions of the shield removed to clarify the illustration, Figure 4 is a fragmentary edge view illustrating the grasping action of the fingers in the grasping zone of the mechanism, Figure 5 is an enlarged perspective view of one of the fingers, Figures 6 and 7 are fragmentary enlargements of the view shown in Figure 1 and showing the construction in greater detail.

Describing the invention in detail, the drawing means generally indicated 1 comprises a circular drawing assembly 2 rotatably mounted on a stationary axis or support shaft 4 supported at opposite ends from a pair of standards 6, 6.

The assembly 2 comprises a supporting disc member 8 provided with axially outwardly oppositely extending hub portions 10 and 12 fitted snugly on bearings 14 and 16 mounted on shaft 4 intermediate the ends thereof. The disc member 8 is formed of reduced thickness outwardly from intermediate its radial extremities to provide an annular shoulder 18 and at one side thereof a clamp ring 20 against the inner side of which is pressed the outer face of a diaphragm ring 22, the inner face of diaphragm 22 bearing against one side of a separator ring 24 mounted on the shoulder 18 together with diaphragm 22 and another diaphragm ring 26 pressed against the opposite side of ring 24 and retained thereagainst by an annular axially adjustable clamping plate 28 mounted on the hub 12 and tightened against the adjacent side of the plate or disc member 8 by a nut 30 threaded on hub 12. The spacer ring 24 is embossed on its sides with a plurality of bosses 29 which bulge the contacting portions of the diaphragms into axially aligned cavities or depressions 31 in the clamp members 20 and 28 to interlock the diaphragms with the clamp members against relative radial and circumferential movement.

An annular series of radially arranged fingers 32 and 34 are disposed at opposite sides of assembly 2. Each finger is formed with a node 36 at its outer extremity convexed toward the adjacent diaphragm and having its crest located outwardly of the outer edge of the adjacent clamp ring 18 or 28. The body portion 38 of each finger extends alongside the adjacent clamping ring and is spaced laterally outwardly thereof. The inner extremity of the body portion of each finger is provided with an outwardly extending flange 40 disposed preferably at an included angle of 90° or more.

The series of fingers 32 are maintained in assembly by an annulus 42 disposed laterally outwardly thereof and encircling the flanges 40, the annulus having on its inner edge a radial slot 44 for each finger of said series 32 and receiving therethrough the body portion thereof. Between the slots 44, the annulus 42 comprises bosses 46 which seat against the external side of the clamping plate 28. The annulus 42 is formed on its inner periphery adjacent to its inner edge with an inwardly convexed annular bead 48 which seats within the crook or concave formed by the juncture of the body portion 38 and the flange 40 of each finger 32. The convexed opposite or external edge of the corner is rockably seated within a complementary seating surface 50 formed on the outer periphery of an annular shoulder on the external side of clamping plate 28 adjacent to the inner extremity thereof. It will be observed that this mounting of the fingers permit their oscillation axially of the diaphragms. This movement is amplified by angling the outer side 52 of each slot 44 laterally radially outwardly. The arrangement of the fingers 32 positions their flanges 40 edge to edge in an annular pattern to form a segmented cam annulus generally designated 54 (Figure 2) which surrounds an eccentric cam bearing 56 secured to the axle 4 adjacent to one end thereof.

The fingers 34 are secured in assembly by a pulley 58 which is formed on its inner side with slots 60, 60 corresponding to the number of fingers and each receiving the body portion of the related finger therethrough. Seating pads 62, 62 circumferentially flank each slot 60 and afford a seat for the pulley against the external side of disc 8 and ring 18 thereof. The pulley is provided on its inner periphery adjacent to its inner edge with an annular bead 64 convexed radially inwardly and fitted into the crook or concave of the juncture of the body portion and flange of each finger 34, the convex side of each such junction is rockably seated in a complementary concave rocking surface 68 formed on an external circular shoulder of disc 8. The flanges of finger 34 are arranged laterally or circumferentially edge to edge to form a segmented ring or annulus generally designated 70 (Figure 3) encircling an eccentric cam bearing 72 fixed on shaft 4.

The outer sides of slots 60 are angled laterally radially outwardly to increase the magnitude of oscillation of fingers 34 axially of assembly 2.

The pulley and annulus 42 are secured together by rivets or nut and bolt assemblies 74, 74. It will be noted that certain fingers 34 are amply apertured at 75 to admit the securing means therethrough without binding.

Figures 2 and 3 illustrate the relative positions of the cam members and it will be noted that the crests 76 and 78 thereof are offset circumferentially with respect to each other and preferably at an angle of about 37½° and that the series of fingers 32 and 34 are interdigitated or offset circumferentially with respect to each other.

A shield generally designated 80 encloses the assembly thus far described and comprises a pair of concavo-convex side panels 82, and 84 disposed with their depressed sides in facing relationship intermediate the supporting standards and suitably fastened thereto. The side panels 82 and 84 are provided with outturned flanges 86 and 88 respectively which are radially enlarged at the grasping zone of the assembly to provide outwardly diverging side guide surfaces 90 and 92 leading into a slot 94 aligned with a strand- or fiber-receiving gap 96 defined between the diaphragms 22 and 26.

In operation the assembly 2 is rotated at a determined speed by a belt 98 trained about the pulley and extending through an aperture 100 in panel 82 to a suitable power source. To enter the strand 102 into the drawing mechanism the workman deposits the strand, as by throwing it between the guide surfaces 90 and 92 whereby it is delivered through slot 94 to the gap 96 at a point upstream of the entry end of the grasping area of the drawing mechanism. The strand enters into the grasping area and is clamped between the diaphragms by the action of the fingers sinuating the diaphragms and strand through the grasping zone as hereinafter described. The strand may be stripped from the drawing mechanism by providing a suitable stripper such as a blade at the discharge end of the grasping zone.

By a comparison of Figures 2 and 3 and as shown in Figure 4, the circumferentially offset arrangement of the cams and interdigitation of the fingers at opposite sides of the assembly provides an indexing mechanism which as each finger enters the grasping zone causes first a finger 32 on one side of the assembly 2 by engaging flange 40 thereof with the related cam to be rocked in a direction biasing the body portion thereof towards the adjacent diaphragm axially of the assembly 2 and pressing the node thereof against the adjacent diaphragm and deflecting the same laterally as at 104 (Fig. 4). This finger is gradually advanced to press more firmly against the diaphragm until it reaches about the center of the grasping area when the inward movement of the finger reaches the maximum inasmuch as the flange 40 of this finger 32 is on the crest 76 of its cam. Thereafter this finger retracts and gradually releases its pressure on the diaphragms. Similarly after a lag of about 37½°, finger 34 succeeding the first described finger 32 is moved to engage its flange 40 with the related cam.

The initiation of actuation of this succeeding finger 34 is timed to take effect just prior to the preceding finger 32 riding the crest 76 of its related cam. This finger 34 advances about its cam and is biased in a direction toward assembly 2 and engages with its node the related diaphragm and deflects the same transversely as at 106 (Fig. 4), the maximum deflection coinciding with the flange 40 of this finger 34 riding on the crest 78 of its cam. It will be seen that this action is continuously alternated and produces an effective drawing grasp on the strand as it is passed through the drawing means.

Sinuation of the diaphragms and closing of the gap is facilitated by tapering the spacer plate radially outwardly about its outer periphery as at 108 to provide nonconstrictive clearance areas for the diaphragms.

It will be observed that at the discharge end of the grasping region, the flange 40 of each finger is moved off its related cam and that the gap will open to permit easy discharge of the strand. Centrifugal force and restorative action of the diaphragms separate the fingers from the diaphragms so that the gap is open to continuously accept upstream increments of the strand.

Stripping may be effected by means such as shown in my copending application Serial No. 221,596 filed April 18, 1951 for Glass Fiber Drawing Mechanism and Process.

What is claimed is:

1. In material attenuating apparatus, support means having opposed drawing faces movable to and fro with respect to each other to grasp and release the material therebetween, and means for urging said faces towards each other and comprising a series of fingers, and means for selectively biasing said fingers in directions to urge said faces towards each other.

2. In material attenuating apparatus, a rotatable structure including a pair of opposed, normally axially spaced, circumferential, flexible drawing elements at the outer periphery of said structure and defining a material receiving gap therebetween, and means for deflecting each element towards the other at a determined zone of said structure to effect a grasping action on the material therebetween and comprising a series of radial fingers receiving said elements therebetween, and means for selectively pressing the fingers against respective elements.

3. In material attenuating apparatus, a circular rotatable support structure with a pair of circumferential opposed drawing surface means adapted to receive the material therebetween, means for biasing said surface means in directions effecting a grasping action on the material and comprising a series of fingers disposed at each side of the structure, means for rotating said structure and fingers, and cam means arranged to alternately shift one finger of each series in consecutive sequence against the adjacent surface means when the finger is moving through a predetermined zone.

4. Apparatus for drawing a glass filament comprising a rotating structure including a pair of annular rubber-like diaphragms arranged side by side with a separator therebetween and defining a filament receiving gap outwardly of the separator, means securing said diaphragms and separator in assembled relationship, a deflector unit disposed at least at one side of the structure and comprising a bearing area adapted to be pressed against the outer side of the adjacent diaphragm for deflecting the same at the area of contact towards the other diaphragm to close said gap and effect a grasping action on the filament extending therethrough, said unit rotating on a common axis with said structure and comprising a series of segments arranged in a circular fashion, a cam bearing fixedly supported eccentrically of said axis and operatively associated with said segments for consecutive individual engagement therewith as said segments move through a predetermined sector of rotation to effect deflecting action of the segments.

5. A drawing apparatus for attenuating a glass filament comprising a circular assembly having a pair of axially spaced rubber-like discs defining a filament receiving gap therebetween and providing drawing faces on adjacent sides, means for directing the filament into said gap, and means for closing the gap by intermittently deflecting said diaphragms towards each other against said filament and comprising a series of fingers arranged in a circular fashion and rotatable with said structure and mounted to pivot transaxially of the structure, and cam means for serially pivoting said fingers towards the structure.

6. A drawing assembly comprising a pair of generally circular axially spaced, flexible drawing elements defining a material receiving gap therebetween, said elements adapted to be flexed axially to grasp the material therebetween, a separator between said elements and having its side surfaces adjacent to its outer periphery converging radially outwardly to afford clearance for said elements when flexed towards each other.

7. A drawing assembly including a pair of resilient annular diaphragms, a separator therebetween, clamping plates disposed outwardly of said diaphragms, means securing said plates, diaphragms and separator in assembly, and interlocking means between said separator, plates and diaphragms for locking the diaphragms with the plates and separator against circumferential or radial movement and comprising a plurality of bosses on said separator and registering apertures in the plates, said bosses bulging contacting portions of the diaphragms into the corresponding apertures.

8. In a material attenuating apparatus, a drawing assembly comprising a support with peripheral, spaced, flexible grasping means adapted to receive the material therebetween, and means for flexing said grasping means into grasping engagement with the material and comprising elements movably mounted on said support and oscillatable towards and away from said grasping means.

9. In material attenuating apparatus, a drawing assembly including laterally spaced opposed flexible drawing elements defining a material receiving gap therebetween, a plurality of biasing members receiving said elements therebetween and movable toward said elements to deflect the same in a manner effecting a grasping action by said elements on the material therebetween, and indexing means for selectively actuating said members into biasing engagement with the adjacent element.

10. In a material attenuating apparatus, a rotatable drawing assembly including a pair of opposed, flexible, axially spaced drawing elements defining a material receiving gap therebetween, a circular series of fingers rockably mounted intermediate their ends at opposite sides of the assembly, cam means operatively associated with one of the ends of each series of fingers, bearing areas on the opposite ends of the fingers adapted for pressing contact with the adjacent element, said cam means effective to rock the related fingers sequentially towards the adjacent element to a degree flexing the adjacent element towards the opposed element and deflecting both elements axially to thereby grasp the material therebetween along a curved area, and means for rotating the assembly and fingers.

11. For a device of the class described, a finger element comprising a body portion having a node adjacent to one end, a fulcrum area adjacent to the opposite end, and a cam segment extending from said area angularly with respect to said body portion.

12. For an arrangement of the type described, a finger element comprising an elongated body portion having a bearing area adjacent to one end, a fulcrum area adjacent to its opposite end, and a cam area elsewhere.

13. In a material attenuating apparatus, a rotatable drawing assembly including a material receiving means, a shield enclosing said assembly and comprising a pair of laterally spaced discs concaved in facing relationship and provided with diverging flanges at their outer peripheries forming guide faces converging to a slot in alignment with said receiving means.

14. In material attenuating apparatus, a drawing assembly including a round rotatable support with a pair of axially spaced drawing elements defining a material receiving gap therebetween, at least one of said elements being movable towards the other to effect a grasping action therewith on the material therebetween, and means for moving said one element towards the other and including segmented biasing means rotatable with the support and movable transaxially thereof, and cam means operatively associated with said biasing means and having a profile adapted for engagement with the individual segments as they are rotated therealong to move the segment towards said one element and the latter against the other element.

15. In apparatus for attenuating glass filaments, support structure, a pair of circular flexible diaphragms extending outwardly from the outer periphery of the structure and normally spaced apart to provide a material-receiving gap therebetween, a circular series of fingers disposed at opposite sides of the assembly, means on the assembly providing a rockable mounting for the fingers, said fingers having radially extending portions with bearing areas outwardly of the support structure for contact with the adjacent diaphragm, a cam segment on each finger extending axially of the axis of rotation of the assembly, and cam means between the segments cooperatively associated with the latter for rocking the respective fingers through engagement with the cam segment thereof in a direction pressing the bearing area of the finger against the related diaphragm and deflecting a section of the diaphragm into grasping contact with the material thereadjacent.

16. In a device of the class described, a material grasping assembly, and means for biasing said assembly to grasping action and including a circular series of fingers having angularly arranged portions, and a rockable mounting for said fingers to permit their oscillation towards and away from the assembly and including a concave seat for the convex side of the juncture between the portions of the fingers, and an annular element having a convex face loosely projecting into the concave at said juncture.

17. In material attenuating apparatus, a rotatable drawing mechanism including a pair of axially spaced flexible elements defining a material-receiving gap therebetween, and means for deflecting a portion of each element towards the other to effect a grasping action on the material within the gap therebetween, said means comprising an annular segmented assembly and means for selectively biasing several adjacent segments of each assembly into deflecting engagement with the related portion of the adjacent element in a manner sinuating the material therebetween, and means for rotating said mechanism and assembly simultaneously with the sinuation of the material by said segments.

18. Apparatus according to claim 17 wherein the biasing of a segment towards one of said elements is followed after a predetermined interval by the biasing of a segment against the other element.

19. In material attenuating apparatus, a rotatable drawing assembly having material engaging means, a shield for the assembly comprising a pair of stationary concavo-convex elements flanking the assembly and arranged with their concave sides in facing relationship, and driving means for the assembly disposed within the concavity of at least one of said elements and including a driving linkage extending substantially radially of the assembly through an opening in the related element.

ADELBERT C. RADTKE.

References Cited in the file of this patent

FOREIGN PATENTS

| Number | Country | Date |
|--------|---------|------|
| 478,383 | Great Britain | Jan. 18, 1938 |
| 512,283 | Great Britain | Aug. 31, 1939 |